5 Sheets--Sheet 2.
J. BLAKEY.
Apparatus for Manufacturing Boot and Shoe Heels.
No. 139,859. Patented June 17, 1873.
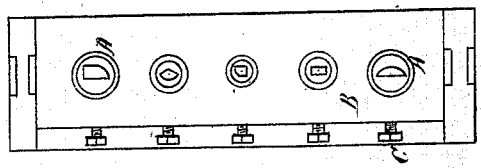
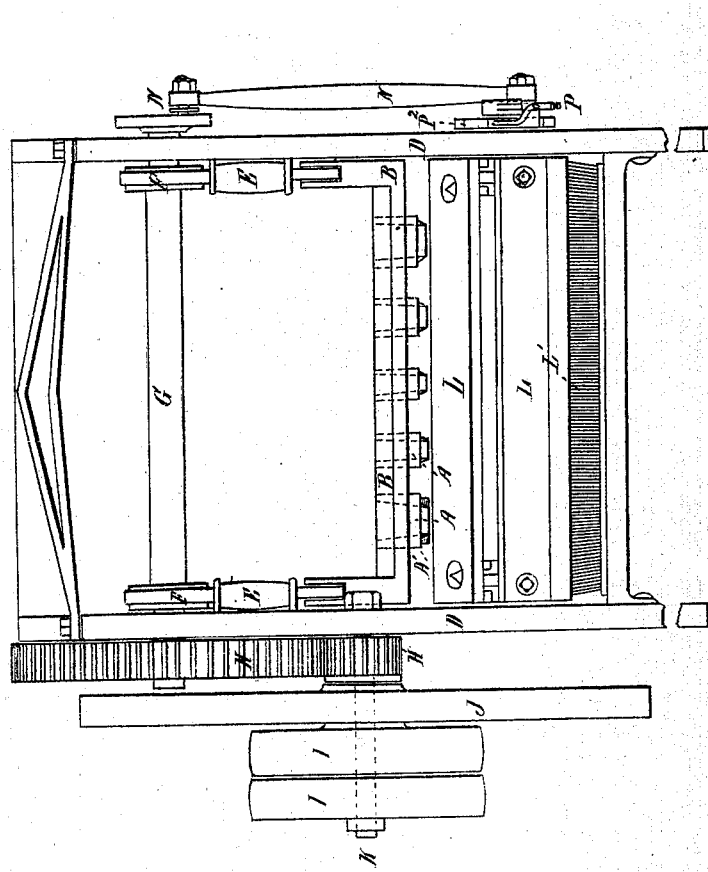
Witnesses.
James Blakey
Thomas Brayshaw
Inventor.
John Blakey

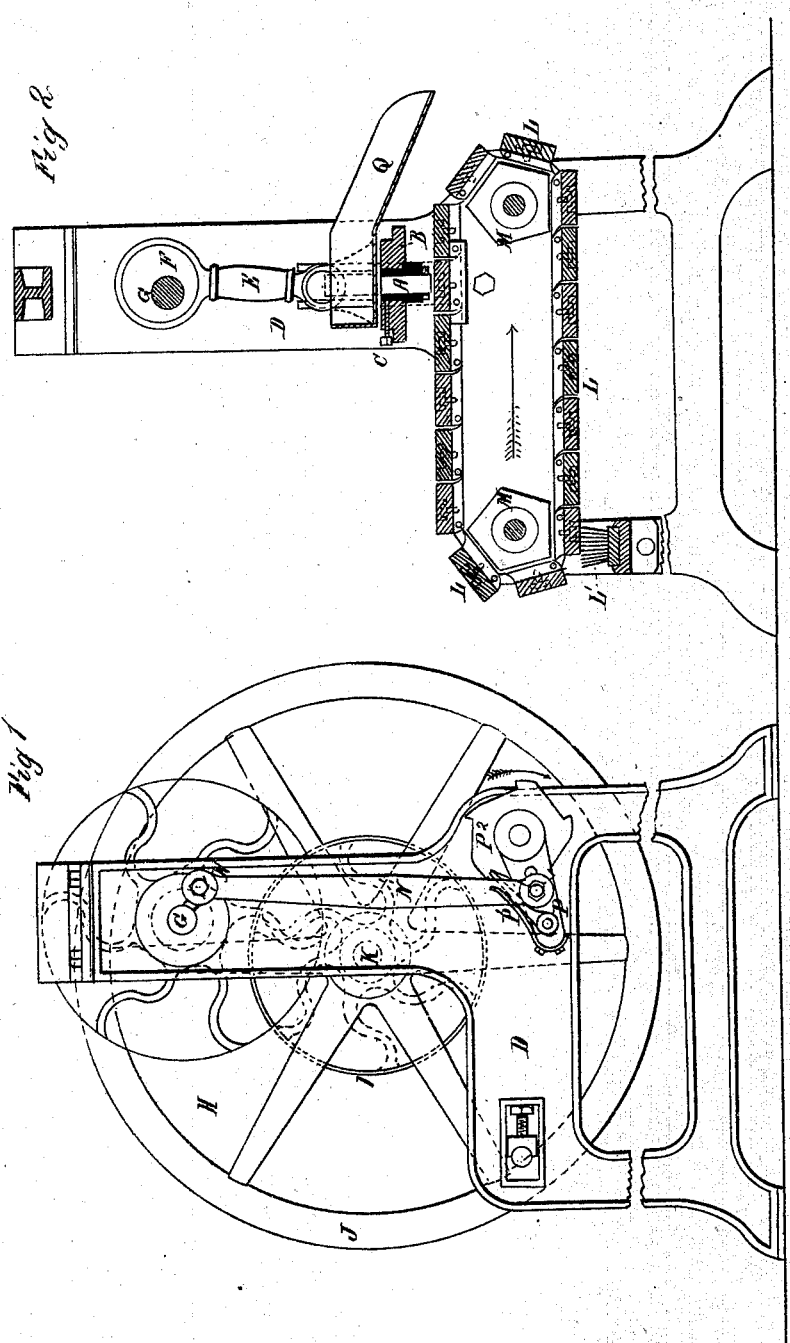

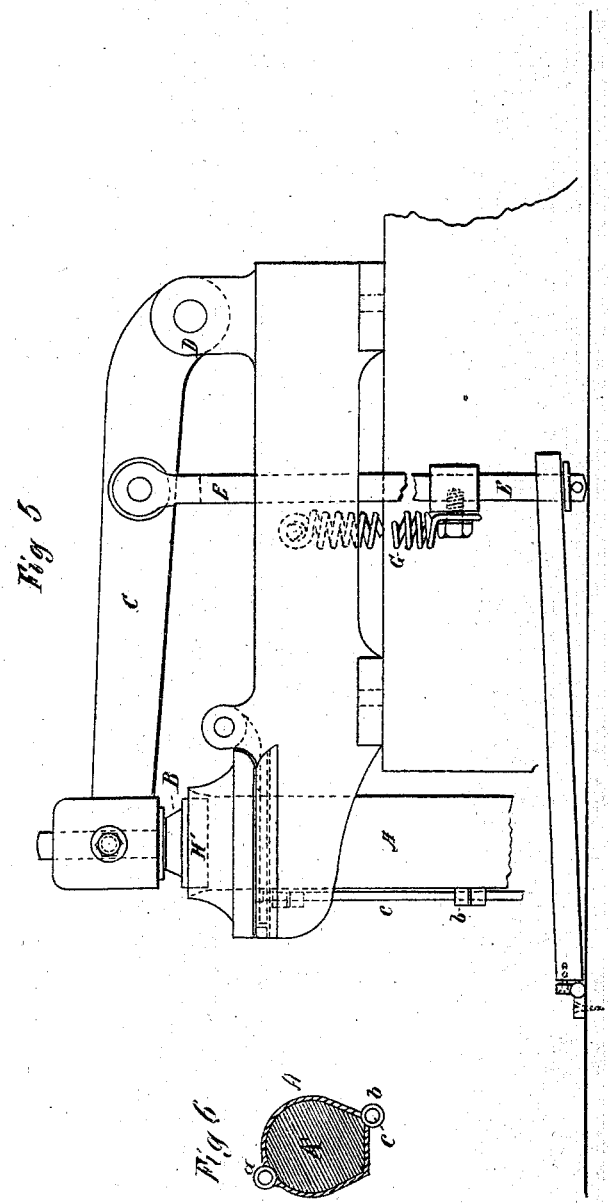
J. BLAKEY.
Apparatus for Manufacturing Boot and Shoe Heels.
No. 139,859. Patented June 17, 1873.

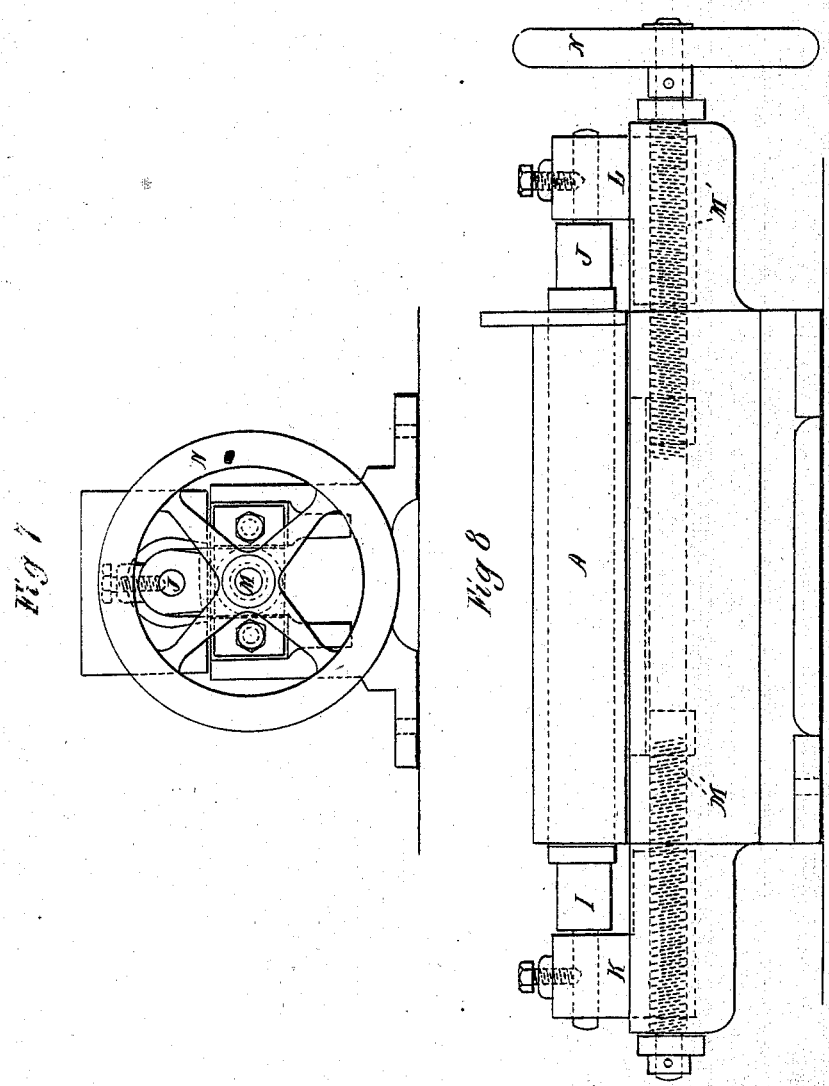

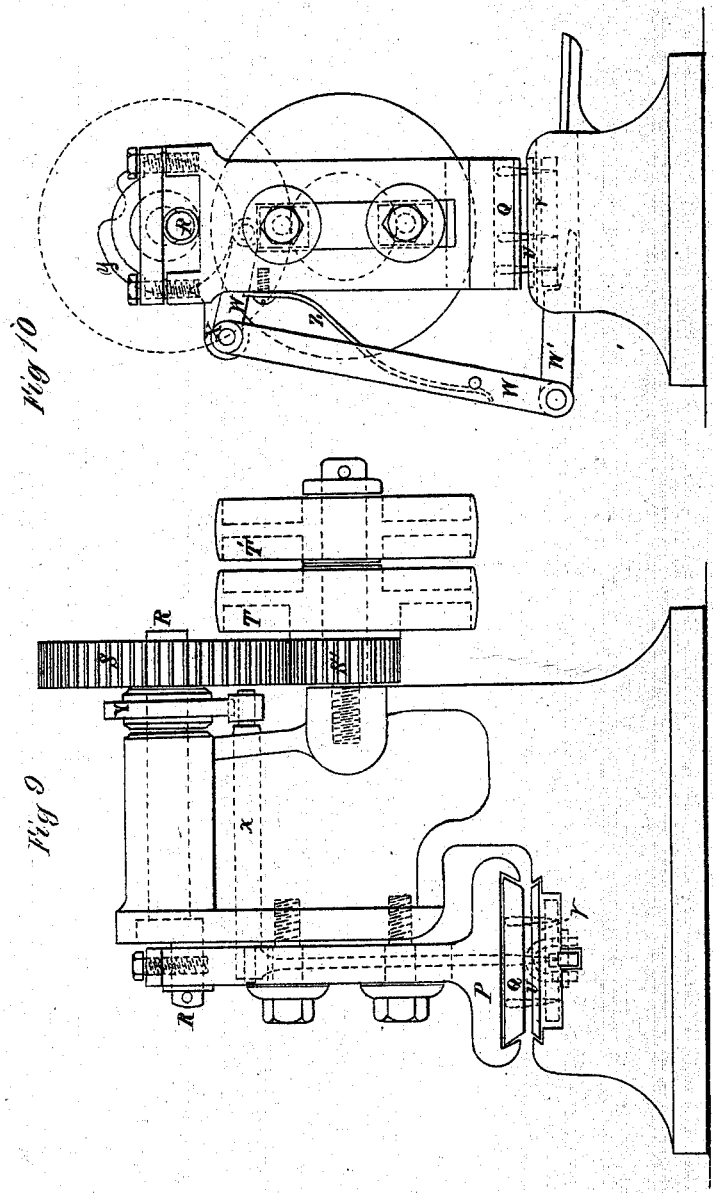

UNITED STATES PATENT OFFICE.

JOHN BLAKEY, OF LEEDS, ENGLAND.

IMPROVEMENT IN APPARATUS FOR MANUFACTURING BOOT AND SHOE HEELS.

Specification forming part of Letters Patent No. 139,859, dated June 17, 1873; application filed May 6, 1871.

*To all whom it may concern:*

Be it known that I, JOHN BLAKEY, of Leeds, in the county of York and Kingdom of England, have invented certain improvements in means and apparatus for utilizing the small pieces of leather resulting from the cutting out of the several parts for boots and shoes, of which the following is a specification:

In cutting out the soles and heels of boots and shoes from sheets of leather, small pieces or scraps remain, which, not being sufficiently large to make whole heels, have heretofore been cut to different shapes to form sections, so that two or more of them may be fitted and joined together so as to form a heel or a "lift" used in building up the heel, and these sections have been stamped out singly by suitably-formed dies or stamp-knives, placed on the scraps by an attendant and then placed under a press.

My improvement consists primarily in a novel method of forming heels or heel-lifts for boots and shoes, by first cutting from waste scraps of leather small pieces, of appropriate sizes and shapes; next, compacting and solidifying such pieces into a solid bar, with or without a wooden core, by means of adhesive material and pressure; next, drying the same and then cutting or sawing the same into heels or heel-lifts of the desired thickness. Also, in the construction and arrangement of a machine or press having a series of the different-shaped dies or stamp-knives suitably arranged therein, and an endless lattice-sheet or a movable table, either reciprocatory or rotary, caused to travel intermittently either under or over the dies or stamp-knives, so that the pieces or scraps of leather may be placed, according to size, on the said sheet in suitable positions and conveyed to the dies or stamps to be cut out thereby to the respective shapes. Also, in an apparatus for molding the bits of leather when cut into form for the purpose of making rolls or blocks of the form of shoe-heels, which comprises a mold or box in two parts hinged together longitudinally and of any desirable or convenient length and suitable sectional form. This box is placed vertically on a table or stand. The top for convenience being placed even with the surface, a lever is hinged on a pillar fixed upon the table, to one end of which lever is attached a rammer of the same form as the box, and in such manner as to enter into it when pressed downward. A spring-treadle is attached to the said lever so that the attendant can operate the same, and a plug is inserted into the top of this box, which, by means of a spring, is held sufficiently tight therein, yet capable of being driven through the box by the action of the rammer. In the using of this apparatus the attendant places a layer of scraps of leather within the box upon the plug, and upon them a coating of paste or other cement, and another layer of scraps; then, by means of the treadle, operates the rammer, which forces them down the box; another layer of cement and scraps is then introduced and the rammer used to force them forward as before, and so on until the box is filled, when it is removed and placed upon a table betwixt a screw-press, by which the said roll is compressed and made solid. The roll is then removed or forced from the mold by means of the said or a similar screw, and laid to dry. When the rolls are sufficiently dry I cut them into slices to any thickness required for lifts or layers of boot and shoe heels by means of a circular-saw or saws of a peculiar construction, namely, being ground hollow or thinner towards the center, so that the teeth require little or no set. The said teeth are sharpened straight across, thus having more cutting-surface and which causes the saw to continue sharp much longer than by the usual method. A fence is used herewith in the usual manner to regulate the thickness of the slices or lifts, as required. Also, in the combination, with an apparatus for pricking a series of holes in the said lifts, for the nailing or pegging of the same together or onto the boot or shoe, of devices for throwing the pricked lift out of the machine, and which combination consists of a box of the form of the lift, and a lever or slide-rod with block, operated by means of eccentric or cam, having the prickers suitably arranged therein and the box perforated for the pricker to pass through. This lever or rod and pricker-block may be worked by hand, foot, or power, and as each of the lifts are pricked they are pushed out of the box by the action of a spring and another is inserted or introduced to be operated upon. The apparatus for molding the scraps into rolls can be adapted for pricking by applying the prickers and the box thereto. The invention further consists in the introduction of wood into the middle of the roll or block in the building up of it in the apparatus, explained in the second part of this invention, which is effected by placing the said wood in a hole formed in the plug and held by being fixed to the bottom of the box, so that the leather scraps, as they are built up around it, pass over the wood until the box is filled, when the mold is taken out and put into the press with the scraps so inserted to be operated upon by the press, and they are then taken out to dry and to cut into slices, with the saw, already as explained.

In order that this invention may be clearly understood, I herein give reference to the accompanying sheets of drawings, illustrating the means and apparatus constructed and employed by me for carrying the same into practical operation. The first step or stage of the invention is shown at Figs. 1, 2, 3, and 4, wherein—

Figure 1 is a side view of a machine for cutting the small pieces or scraps of leather into suitable forms to be selected and put together to form whole heels or lifts. Fig. 2 is a vertical section. Fig. 3 is a front view of the feeding end of the machine, and Fig. 4 is a plan of the dies.

A represents a series of the different-shaped dies or stamp-knives fixed in a plate or block, B, by set-screws C. This plate or block is capable of sliding up and down in suitable guides in the frame-work D, being connected by rods E to eccentrics F, fixed on a rotary shaft, G, which receives motion by gearing H from the driving-pulleys I, which, with a balance wheel, J, are mounted upon a stud, K, fixed in the frame-work D. A series of plates or blocks, L, hinged together and fixed by screws upon two endless chains are mounted upon two rollers, M, of pentagonal form, which are mounted in the frame-work and have intermittent rotary motion imparted to them by means of a crank, N, fixed on the shaft G, to which is attached a rod connected to a lever, P, hinged on the end of the shaft of one of the said rollers M, and this lever carries a spring-catch, $P^1$, which takes into notches formed on a wheel or plate, $P^2$, fixed on the said shaft, whereby at each revolution of the crank N the lattice-sheet is moved one plate or block forward, thus corresponding with the motions of the dies or stamps A. These blocks L may be of wood or other suitable material, and by the action of the machine, the particular forms of the different dies or stamps will be marked thereon, (as shown at Fig. 4, which is a plan view of the block B and the dies or stamps A,) so that in the using of the machine the pieces or scraps of leather are to be selected and placed upon the several marks on the blocks L at the feeding end, which on being carried forward thereby under the dies or stamp-knives, are cut to the shape required. The cut parts, passing up through the hollow interior part of the said dies, are discharged into and pass away by the spout Q into any receptacle provided for them to fall into. A ring of India rubber, or a helical-spring, A′, or a perforated plate is placed on each die or stamp to push off the waste portions of leather at each cut, and should any adhere to the surface of the blocks L they will be removed by the brush L′. Or, instead of using movable blocks to cut upon, as shown and described, the straps of leather may be carried to the cutter by means of thin metal plates attached to the chains, (similarly to the blocks,) with apertures formed therein through which the edges of the knives pass and cut the scraps upon a block fixed upon the bed of the machine.

The second stage or step is shown at Figs. 5 and 6, where Fig. 5 is a side elevation of the machine or apparatus for molding the bits of leather into form; and Fig. 6 is a cross-section of the mold or box A, which is in two parts, hinged together longitudinally at $a$, and the opening sides secured by loops $b$ and pin $c$. This box is of the sectional form of a shoe-heel, and is placed temporarily in a vertical position in the frame of the machine, immediately under the rammer B, which is of the same form as the box, the said rammer being secured in the end of the lever C, which is hinged to a pillar or bracket, D, fixed to the frame of the machine. A rod, E, attached to the lever, is connected to a treadle, F, and a spring, G, attached to the rod E, is connected to the frame. H′, in Fig. 5, is a mouth-piece or guide, hinged to the frame and to fit the box, top end. The attendant, by pressing the treadle with the foot, brings the rammer down into the box, and on taking off the pressure, the spring raises the rammer. A plug shown at A′, in Fig. 6, is formed to fit the box closely, and having a spring, if desired, to hold it tight therein, yet so that the rammer may force it down. As previously stated, the attendant in using this machine, places scraps of leather on the top of the plug in the box and forces the rammer upon them. He then applies a coating of paste or cement of strong adhesive quality, then another layer of scraps, and again forces the rammer down upon them, and so on until the box is filled, when it is removed from this machine and placed in a press shown at Figs. 7 and 8, where A is the box. I and J are a pair of rams made to enter the box and carried upon movable brackets, K and L, which are operated by the screw-spindle M′, by means of the hand-wheel N, so as to compress the scraps of leather in the box until they become sufficiently solidified, when the roll is removed to be dried and treated as hereinafter explained.

The third stage or step of the invention will be readily understood without reference to drawings, as for this purpose I have found that by means of a circular-saw made thinner in the central part than the periphery, with the teeth cut and sharpened square across it, and by aid of an ordinary fence or guide-plate, rolls of leather scraps, formed as previously explained, when dry can be cut into slices to any desirable thickness to form "lifts" for heels of boots and shoes.

The fourth step or stage is shown at Figs. 9 and 10, where Fig. 9 is the side elevation and Fig. 10 is the end or front elevation of a machine for pricking holes in the said "lifts." P is a stem carrying a series of prickers fixed in a block, Q, fitting in a dovetail slot of the stem. This stem is caused to move or rise and fall by means of an eccentric or crank-shaft R, to which it is attached, and which shaft has rotary motion given to it by gear-wheels S and S' from the driving-pulleys T and T', the whole being supported in suitable framing. Under the prickers is another dovetail slot in the frame into which is a plate, U, perforated for the prickers to pass through it, and under this plate is a space or recess to introduce a "lift," V, to be pricked. W is a bell-crank or two-armed lever, both arms being secured to the rock-shaft X, and on one arm is a bowl which is acted upon by an eccentric or cam Y on the shaft R, and the other arm by a spring, Z, and on this arm is also a catch, W', for pushing the lifts out of the recess after being pricked.

The fifth step or stage of this my invention, will also be understood without the aid of drawings.

In the building up of the rolls of scraps of leather, explained in the second part, I introduce a pice of wood into the center of the mold or box, and place the scraps around it. The wood being fixed at the bottom of the box, and passing through a hole formed for it in the plug, the scraps are forced forward over or along the sides of the wood until the mold is filled, when the whole roll thus formed of scraps, and wood in the center thereof, is taken out to dry, as previously explained.

I claim—

1. The described method or process of forming heels or heel-lifts for boots and shoes, by first cutting from waste scraps of leather small pieces, of appropriate size and shape; next, compacting and solidifying such pieces into a solid bar, with or without a wooden core, by means of adhesive material and pressure; next, drying the same; and then cutting or sawing the same into heel-lifts of the desired thickness.

2. The combination, with an endless travelling lattice-sheet or table, of a series of simultaneously operating cutting-dies of different sizes and shapes, adapted each for acting on separate bits of leather placed therein according to size and an appropriate stationary bed beneath the lattice or table to sustain the thrust of the series of cutting-dies, substantially as and for the purpose set forth.

3. The described combination of the hinged mold or box, A, rammer B operating as described, and a friction-plug within the mold, or their mechanical equivalents.

4. The described apparatus for squeezing and solidifying the cemented rolls while in the mold A, the same consisting in the rams I and J, entering the opposite sides of the mold, and operated by the screw-spindle M', to force both rams toward each other, to compress the roll in the manner dscribed.

5. In combination with an apparatus for pricking holes into the lifts, the described devices for automatically throwing the lifts, when pricked, out of the recess in the bed, the same consisting of the catch W', lever W, spring Z, and eccentric Y, or their equivalents.

JOHN BLAKEY.

Witnesses:
 THOMAS BRAYSHAW,
 JAMES BLAKEY.